United States Patent [19]

Satterfield

[11] 4,445,322
[45] May 1, 1984

[54] APPARATUS TO MEASURE YARN TENSION

[75] Inventor: Larry S. Satterfield, Moore, S.C.

[73] Assignee: Milliken Research Corporation, Spartanburg, S.C.

[21] Appl. No.: 442,322

[22] Filed: Nov. 17, 1982

Related U.S. Application Data

[62] Division of Ser. No. 236,966, Feb. 23, 1981, Pat. No. 4,393,725.

[51] Int. Cl.³ .................. D01H 13/32; G01L 5/10; G01H 13/00
[52] U.S. Cl. ........................................... 57/264
[58] Field of Search .............. 57/264, 265; 73/160, 73/862.41

[56] References Cited

U.S. PATENT DOCUMENTS

| | | | |
|---|---|---|---|
| 2,618,970 | 11/1952 | Hitchcock et al. | 73/862.41 |
| 2,744,408 | 5/1956 | Seney | 73/160 X |
| 3,273,380 | 9/1966 | Seney | 73/160 X |
| 3,486,369 | 12/1969 | Korzelius | 73/160 X |
| 3,854,329 | 12/1974 | Jones | 73/862.41 |
| 4,235,102 | 11/1980 | Karlsson | 73/862.41 |

FOREIGN PATENT DOCUMENTS

| | | | |
|---|---|---|---|
| 883874 | 12/1961 | United Kingdom | 73/160 |
| 444956 | 10/1974 | U.S.S.R. | 73/862.41 |

Primary Examiner—Donald Watkins
Attorney, Agent, or Firm—Earle R. Marden; H. William Petry

[57] ABSTRACT

Apparatus to cause a running length of yarn to vibrate at its harmonic frequency and to electronically measure the harmonic frequency thereof to provide a signal which can be employed to maintain and/or correct the parameters of the system to maintain a desired tension in the yarn being run.

2 Claims, 2 Drawing Figures

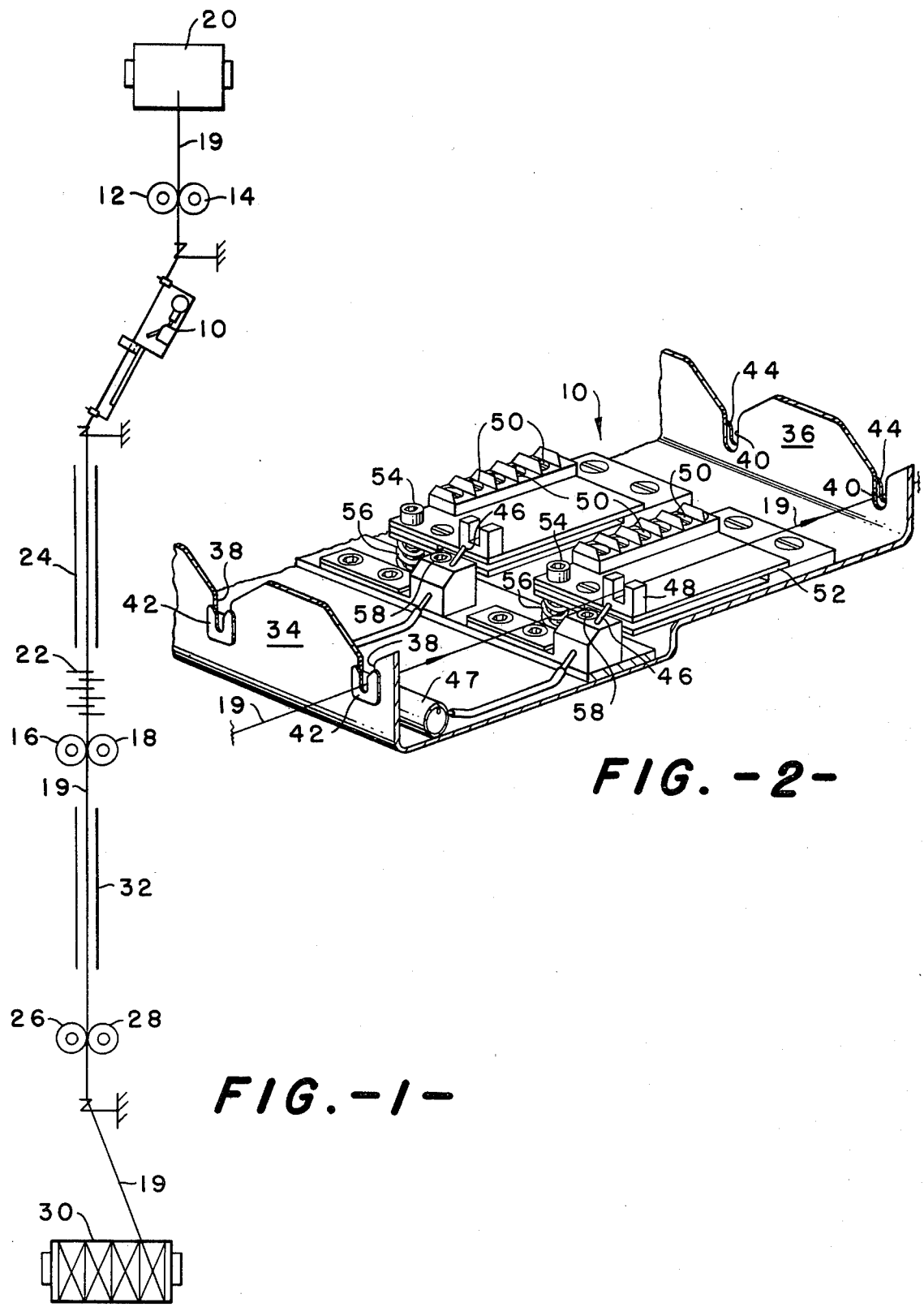

APPARATUS TO MEASURE YARN TENSION

This is a division of application Ser. No. 236,966, filed Feb. 23, 1981, now U.S. Pat. No. 4,393,725.

In most textile operations wherein a running strand of yarn is either produced, modified or fabricated, it is advantageous to maintain a constant yarn tension because variations in yarn tension cause unwanted effects in the yarn or the fabric being produced therefrom.

Therefore, it is an object of the invention to provide a novel apparatus to measure the tension and/or variations in the tension of a yarn as it runs continuously without physically touching the yarn.

Other objects of the invention will become readily apparent as the specification proceeds to describe the invention with reference to the accompanying drawing, in which:

FIG. 1 is a schematic representation of a false twist yarn process employing the novel yarn tension variation detector, and FIG. 2 is a perspective view of the specific device to detect yarn tension variations.

Looking now to the drawings, the yarn tension variation detector 10 is employed between the yarn delivery rolls 12, 14 and the draw rolls 16, 18 of a false twist yarn producing system. In conventional manner a multi-filament, continuous, fully oriented or partially oriented synthetic yarn 19 is supplied from a supply package 20 to the false twist device 22 through a primary heater 24 by the rolls 12, 14. From the false twist device 22, the false twisted yarn is delivered by the draw rolls 16, 18 and take-up feed rolls 26, 28 to the take-up package 30 through the secondary heater 32. The false twist device 22 can be any suitable device such as friction discs, pin twister or belt-type.

The yarn tension variation detector 10 basically employs air under pressure to vibrate the yarn 19 at its harmonic frequency and employs an infra-red photo detector to measure harmonic frequency of the yarn. A change in the harmonic frequency of the vibrating yarn indicates a change in the yarn tension. The signal from the infra-red detector can be delivered to a read-out device, such as a counter, and an operator can make a manual change in the system or the signal can be supplied to an automatic device which can automatically change roll speeds, etc. to maintain the desired tension on the yarn.

The yarn tension variation detector 10 can be a single unit for a single end of yarn 19 or be a multiple unit for multiple ends of yarn 19, as shown in FIG. 2. Each unit 10 is enclosed by a substantially U-shaped frame having upstanding end plates 34 and 36 with notches 38 and 40, respectively, therein. Mounted around or in each of the notches 38 and 40 are replaceable ceramic guides 42 and 44, the opening thereof of a size to accommodate a particular range of yarn diameters or devices.

As indicated in FIG. 2, the yarn 19 passes through the detector 10 in the direction indicated by the arrows. As the yarn passes through the detector, it passes over an air jet 46, receiving air from the manifold 47, whereat the yarn 19 is vibrated by impingement thereon of air from the jet 46. Located downstream of the jet 46 is an infra-red photo detector 48 through which the yarn passes to the ceramic guide 44. The infra-red photo detector 48 measures the frequency of vibration of the yarn 19 and generates a signal. This signal can be transmitted to the appropriate automatic response device by connection to one or more of the electrical tops 50 mounted on the cantilevered detector support plate 52. The position of the plate 52 can be adjusted to properly locate the detector 48 relative to the yarn 19 by adjustment of the screw 54 in cooperation with the spring 56. The position of the air jet 46 can also be adjusted by adjustment of the screw 58.

OPERATION

The invention described is predicated on the fact that a yarn stretched to certain tension and having a certain length will have a certain harmonic frequency. Then, if the tension of a certain pre-determined length of yarn changes, the harmonic frequency will change. By measuring the harmonic frequency of the vibrating yarn 19, the tension and/or changes of tension in a yarn can be detected. The first natural frequency of a yarn can be found by the following formula:

$$\text{1st Natural Frequency } (f_1) = \frac{1}{2L} \times \sqrt{\frac{T}{rho}}$$

where
L=length in meters
T=tension in grams
rho=mass per unit length (gms/meter)

The tension or changes can be computed by measuring the frequency of the vibrating yarn and using the above formula to compute the tension.

In operation, the length of yarn between the guides 42 and 44 and the air from jet 46 is directed against the yarn to cause the yarn 19 to be vibrated at its harmonic frequency. Then as the yarn 19 passes detector 48, the frequency is measured and the signal generated thereby is delivered to a counter or other suitable device. The counter or other suitable device can be calibrated electronically to incorporate the above formula to provide a direct reading or response to the measured frequency. In this manner, the tension in the yarn 19 is continuously monitored and can be maintained at a substantially constant value.

Although the specific embodiment of the invention has been described, it is contemplated that changes can be made without departing from the scope or spirit of the invention and I desire to be limited only by the scope of the claims.

I claim:

1. Apparatus to provide a false twisted continuous filament, synthetic yarn comprising: a yarn supply means, a false twist mechanism, a primary heater means between said yarn supply means and said false twist mechanism, a yarn take-up means, a secondary heater means between said false twist mechanism means and said yarn take-up means and a means to measure the tension of the yarn being supplied from said yarn supply means, said means including a means to vibrate the yarn at its harmonic frequency and a means to measure the harmonic frequency of the yarn.

2. The apparatus of claim 1 wherein said means to measure the tension of the yarn includes a frame, at least one pair of guide members attached to said frame and longitudinally spaced from one another and said air jet means and said means to measure are located adjacent one another between said pair of spaced guide members.

* * * * *

UNITED STATES PATENT AND TRADEMARK OFFICE
CERTIFICATE OF CORRECTION

PATENT NO. : 4,445,322

DATED : May 1, 1984

INVENTOR(S) : Larry S. Satterfield

It is certified that error appears in the above-identified patent and that said Letters Patent is hereby corrected as shown below:

Column 1, line 56, "thereof" should be "therein".

Signed and Sealed this

Second Day of October 1984

[SEAL]

Attest:

*Attesting Officer*

GERALD J. MOSSINGHOFF

*Commissioner of Patents and Trademarks*